(12) United States Patent
Gregory et al.

(10) Patent No.: US 9,915,530 B2
(45) Date of Patent: *Mar. 13, 2018

(54) ILLUMINATION DEVICE FOR USE WITH SURVEY LEVEL ROD AND METHOD OF USE

(71) Applicant: RM Asset Group, LLC, Aurora, CO (US)

(72) Inventors: Michael J. Gregory, Aurora, CO (US); Reed W. Baker, Strasburg, CO (US)

(73) Assignee: RM ASSET GROUP, LLC, Aurora, CO (US)

( * ) Notice: Subject to any disclaimer, the term of this patent is extended or adjusted under 35 U.S.C. 154(b) by 96 days.

This patent is subject to a terminal disclaimer.

(21) Appl. No.: 14/518,533

(22) Filed: Oct. 20, 2014

(65) Prior Publication Data

US 2015/0138824 A1 May 21, 2015

Related U.S. Application Data

(63) Continuation of application No. 13/361,734, filed on Jan. 30, 2012, now Pat. No. 8,864,327.

(60) Provisional application No. 61/437,385, filed on Jan. 28, 2011.

(51) Int. Cl.
| | | |
|---|---|---|
| *G01D 11/26* | (2006.01) | |
| *G01C 15/06* | (2006.01) | |
| *F21V 33/00* | (2006.01) | |
| *F21K 9/61* | (2016.01) | |
| *F21Y 103/10* | (2016.01) | |
| *F21Y 115/10* | (2016.01) | |

(52) U.S. Cl.
CPC ............... *G01C 15/06* (2013.01); *F21K 9/61* (2016.08); *F21V 33/00* (2013.01); *F21Y 2103/10* (2016.08); *F21Y 2115/10* (2016.08); *Y10S 362/80* (2013.01)

(58) Field of Classification Search
CPC ... F21K 9/52; F21Y 2101/02; F21Y 2103/003
USPC ......... 362/23.01, 23.07, 23.09, 23.11, 23.16, 362/119, 120, 253, 551, 553, 555, 577, 362/800
See application file for complete search history.

(56) References Cited

U.S. PATENT DOCUMENTS

| | | |
|---|---|---|
| 2,612,994 A | 10/1952 | Woodland et al. |
| 4,030,832 A | 6/1977 | Rando et al. |
| 4,047,017 A * | 9/1977 | Herring ................ F21V 21/145 362/118 |
| 4,673,287 A | 6/1987 | Rickus |

(Continued)

OTHER PUBLICATIONS

Official Action for U.S. Appl. No. 13/361,734, dated Sep. 27, 2013, 8 pages.

(Continued)

*Primary Examiner* — Elmito Breval
*Assistant Examiner* — Meghan Ulanday
(74) *Attorney, Agent, or Firm* — Sheridan Ross PC

(57) ABSTRACT

A laser readable surveying rod is provided with adjustable lighting elements. More specifically, lighting elements, such as LED lights are provided along a length of a surveying rod such that laser readings may be taken at night or in dark conditions. Lighting elements may be translated along a length of a rod, particularly where it is desirable to illuminate only a portion of a rod and conserve valuable energy.

11 Claims, 3 Drawing Sheets

(56) References Cited

U.S. PATENT DOCUMENTS

| | | | |
|---|---|---|---|
| 4,799,132 A * | 1/1989 | Perlsweig | B43K 29/10 |
| | | | 362/118 |
| 5,884,240 A | 3/1999 | Edgar et al. | |
| 6,584,697 B1 | 7/2003 | Guoan et al. | |
| 7,101,103 B1 * | 9/2006 | Dietz | B43K 25/024 |
| | | | 24/11 HC |
| 7,257,903 B2 | 8/2007 | Lee | |
| 7,788,815 B2 | 9/2010 | Yandrick et al. | |
| 8,864,327 B2 * | 10/2014 | Gregory et al. | 362/23.07 |
| 2002/0073562 A1 | 6/2002 | Brink | |

OTHER PUBLICATIONS

Notice of Allowance for U.S. Appl. No. 13/361,734, dated Jun. 19, 2014, 8 pages.

* cited by examiner

ILLUMINATION DEVICE FOR USE WITH SURVEY LEVEL ROD AND METHOD OF USE

This application is a continuation of U.S. patent application Ser. No. 13/361,734, filed Jan. 30, 2012, which claims the benefit of priority from U.S. Provisional Patent Application No. 61/437,385, filed Jan. 28, 2011, the entire disclosures of which are incorporated by reference herein.

FIELD OF THE INVENTION

The present invention relates generally to surveying equipment. More specifically, the invention relates to a land surveying and field engineering or elevation measuring rod or staff, including both bar-coded reading and conventional rods used in combination with an illumination device. The illumination device is adapted for use with a sighting instrument such as a digital electronic (e.g. laser) leveling instrument and conventional (e.g. visual) reading to transfer, measure, or set horizontal levels/elevations.

BACKGROUND OF THE INVENTION

Surveying instruments are known to assist in critical building and construction functions. For example, building foundations, runways, roads, roadbeds, and retaining walls must be engineered and constructed within a certain degree of accuracy if they are to perform their desired functions in a proper manner and maintain structural integrity over time. Leveling instruments, rods, theodolites, transits, laser beam measuring systems, and similar components are often used to achieve the desired degree of accuracy and precision for these features and operations.

It is known that construction sites, such as those intended for buildings, roads, tunnels, utilities and airport runways, are generally not level. However, they must at least have sections with a uniform change in elevation. They may also have side slopes in a direction transverse to the direction of vehicle traffic to carry water away. High areas and low areas can hold water and force vehicles to reduce speed. High spots in low areas on a runway can render a runway unusable for high speed aircraft. Such areas can also increase loads on aircraft structures and reduce the useful life of aircraft. Land surveyors and engineers often use leveling instruments and a measuring rod to measure and calculate elevations at selected positions. Further, critical elevation calculations are required during the construction of buildings, installation of sensitive electronic equipment and in countless other applications. These devices have required skilled individuals and meticulous records to avoid mistakes in measuring and in calculating results.

Previously, night or low light operations would simply be avoided due to costs associated with increased time and labor, as well as increased risk of error due to misreadings and miscalculations attributable to poor visibility. Such operations include, for example, night time surveying when a runway/taxiway is closed, inside industrial plants having low or no-light conditions, inside tunnels, water transmission systems, or mining operations.

Lasers are available today to assist in determining elevations. Such devices can improve the accuracy, precision, and speed of the measuring process. A digital level unit may scan a bar-coded level rod and, based on the graduations of the rod, read and record rod height to a highly accurate degree. Recorded heights may then be automatically added or subtracted from a reference point to establish an offset value. These devices and systems generally provide faster and more accurate measurements with a higher degree of repeatability and precision. However, digital electronic (e.g. laser) and conventional (e.g. visual) readings are known to be impractical, inconvenient, difficult, or nearly impossible to use in dark and/or night-time conditions.

Prior art devices fail to provide adequate lighting with respect to intensity and uniformity for solutions in connection with surveying rods and instruments. For example, it is known to be generally impractical, dangerous, and/or inconvenient to employ known extension cords in many applications. Additionally, many known battery systems (e.g. flashlights) are heavy and offer relatively short run-times and are cumbersome to use with the other items that a instrument operator would have in hand such as a field book, pencil, maps, etc. during leveling operations. Large-scale lighting systems for construction applications often require power generation means, such as gas-powered generators, and further fail to offer acceptable lighting solutions for enabling a laser to read or communicate with a leveling rod, as well as the added requirement of mobility that often reaches a half mile or more.

Accordingly, and further in light of the fact that it may be desirable to conduct various surveying and construction operations in off-peak night time hours, there has been a long-felt yet unmet need to provide a leveling rod adapted for use at night and at a variety of distances.

SUMMARY OF THE INVENTION

The Summary of the Invention is neither intended nor should it be construed as being representative of the full extent and scope of the present disclosure. The present disclosure is set forth in various levels of detail in the Summary of the Invention as well as in the attached drawings and the Detailed Description of the Invention and no limitation as to the scope of the present disclosure is intended by either the inclusion or non-inclusion of elements, components, etc. in this Summary of the Invention. Additional aspects of the present disclosure will become more readily apparent from the Detailed Description, particularly when taken together with the drawings.

The following references are hereby incorporated by reference in their entireties: U.S. Pat. No. 2,612,994 to Woodland et al., U.S. Pat. No. 4,030,832 to Rando et al., U.S. Pat. No. 4,673,287 to Rickus, U.S. Pat. No. 6,584,697 to Guoan et al., U.S. Pat. No. 7,257,903 to Lee, U.S. Pat. No. 7,788,815 to Yandrick et al., and U.S. Patent Application Publication No. 2002/0073562 to Brink.

As used herein, a rod will be understood to refer to any number of known surveying, measuring, leveling, ranging, etc. staffs or poles as used in the surveying field, including various telescoping, fixed, foldable, etc. poles. Thus, the term "rod" should not be construed as limiting the present invention to a particular surveying device in any way. By way of example only, the Leica Geosystems GSS113 METRIC Fiberglass Dual Face Telescopic Leveling Rod is one specific rod contemplated for use with the present invention.

In various embodiments, the present invention comprises an adjustable illuminating device adapted for use with a surveying rod for both digital electronic and conventional reading rods. In one embodiment, lighting elements enable a laser to read information disposed on the rod, such as positioning location as conveyed or displayed by bar-code information on the rod. In another embodiment, an illumination device is provided for illuminating a conventional (i.e. visual rod) such that conventional viewing and reading operations can be performed at night or otherwise dark conditions. In yet another embodiment, an illumination device is provided, the device being capable of being selectively removable and/or positionable on any number of devices as may be desired by a user.

In various embodiments, lighting elements are provided along a length of a surveying rod, the lighting elements being adjustable and/or translatable along a vertical length of the rod. Obviously, lighting devices require some power source in order to emit light. In the field, power sources may be scarce and may be limited to sources having a finite supply of power, such as portable and/or rechargeable batteries. Accordingly, one embodiment of the present invention comprises a lighting element(s) that direct light to only a portion of a surveying rod, rather than illuminating an entire rod and consuming valuable energy when a reading(s) need only be taken from a small segment of the rod.

In various embodiments, lighting elements are selectively translatable along a length of the rod, such that a reading may be taken on a discrete illuminated portion of the rod. For example, in one embodiment, a track is provided along a length of a rod and a lighting element is slidably coupled to the track. The lighting element, which may comprise one or more light-emitting diodes ("LED"), further comprises a securing device for selectively securing the lighting element in a desired location without the need for stabilization by a human hand, for example. Securing devices of the present invention may comprise, but are not limited to various clamps, vice-grips, one handed bar clamps, angle clamps, band clamps, bar clamps, c clamps, deep throat clamps, frame clamps, spring clamps, spring clamps, toggle clamps, and similar devices.

In one embodiment, one or more lighting elements are secured to a track of the present invention and selectively displaced or translated through a user-operated motor feature. In one embodiment, the user-operated motor feature is powered by a battery disposed on and/or contained within the lighting element/motor combination. It is known that operators of such equipment may be required to stand relatively motionless for extended periods of times in often undesirable environmental conditions. As such, it is often desirable to minimize the amount of effort a user must exert in connection with manipulating and/or stabilizing devices of the present invention. Accordingly, a lighting element may be motor-driven along a length of the leveling rod through activities as simple as pressing a button.

In an alternative embodiment, lighting elements of the present invention are secured in a desired vertical position through one or more pins. For example, a track and/or leveling rod may be provided with apertures or recesses adapted for receiving a pin, the pin further adapted for accommodating the weight of the lighting element and maintaining the lighting element in a desired location.

Prior art devices generally require professionals to own and operate two distinct devices, one adapted for daytime use and another which comprises lighting elements within a main body portion of the device. Known devices comprising lighting elements within a main body portion are expensive and often cumbersome. Thus, in various embodiments, the need for separate devices is obviated by providing a selectively attachable and removable lighting apparatus for use with various surveying rods.

In various embodiments, an illumination device is provided that is selectively detachable and further capable of being stored during use of the rod during normal daytime conditions. The device can be selectively attached during occasions where illumination is required. Thus, in various embodiments, the present invention allows a user to work in well lighted conditions, or darkened conditions without the need for purchasing, and/or carrying two separate rods.

In an alternative embodiment, the present invention comprises a leveling rod with lighting elements disposed within a main portion of the leveling rod. For example, in a particular embodiment, the present invention comprises gradations and/or bars capable of being illuminated or emitting light from within. In a particular embodiment, lighting elements generally span the entire length or at least the entire readable length of a leveling rod and are adapted to illuminate the entire measuring instrument. In an alternative embodiment, lighting elements generally span the entire length of the leveling rod and the rod further comprises a switch or control for changing a portion of the rod that is illuminated. For example, in one embodiment, the rod is provided with a slider switch for adjusting the portion of the rod that is illuminated, thereby conserving power by eliminating the need to illuminate the entire length of the rod when a reading is only needed at one particular location. In yet another embodiment, lighting elements are provided within a leveling rod and are selectively illuminated in sections. Thus, for example, various portions (e.g. top ¼, top ⅓, top ½, etc.) may be illuminated while remaining portions are not activated to increase efficiency of the system.

In various embodiments, the present invention contemplates lighting elements that utilize any number of lighting means including, but not limited to LED lights, incandescent lights, compact fluorescent ("CFL") lighting, fluorescent lighting, etc. However, in one embodiment, it is preferable to provide LED lights for use in lighting elements of the present invention given their long operational life and general performance capabilities. Indeed, field tests have shown that LED lights used in accordance with embodiments of the present invention have shown unexpected results in the sense of enabling a laser to read information from a leveling rod, for example.

In one embodiment, the present invention comprises solar-powered capabilities for power a lighting element and motor/power device. For example, in one embodiment, the present invention comprises solar panels for receiving and storing solar energy which may subsequently be discharged at night when it is necessary or desirable to operate lighting elements and/or power devices.

In various embodiments, lighting elements are adapted to pivot or rotate about an axis that is generally parallel with a longitudinal axis of a leveling rod. Accordingly, lighting elements of the present invention may be rotated to various angular positions in order to adjust the amount of light impacting the leveling rod or simply to move the lighting element to a position where it is generally not capable of obstructing various movements and activities.

In various embodiments, an adjustable lighting element is provided in combination with a leveling rod, the lighting element powered by a battery unit or pack comprising one or more lightweight rechargeable batteries. In one embodiment, a battery unit comprises a user-mounted device connected to one or more lighting elements disposed on or adapted to be connected to a leveling rod. In an alternative embodiment, a battery unit comprises a device mounted on a leveling rod or the operator (e.g. rod-person) and connected to or adapted to be connected to one or more lighting elements.

The above-described benefits, embodiments, and/or characterizations are not necessarily complete or exhaustive, and in particular, as to the patentable subject matter disclosed herein. Other benefits, embodiments, and/or characterizations of the present disclosure are possible utilizing, alone or in combination, as set forth above and/or described in the accompanying figures and/or in the description herein below. Further details and other features will become apparent after review of the following Detailed Description and accompanying drawing figures.

BRIEF DESCRIPTION OF THE DRAWINGS

Those of skill in the art will recognize that the following description is merely illustrative of the principles of the disclosure, which may be applied in various ways to provide many different alternative embodiments. This description is made for illustrating the general principles of the teachings of this disclosure invention and is not meant to limit the inventive concepts disclosed herein.

The accompanying drawings, which are incorporated in and constitute a part of the specification, illustrate embodiments of the disclosure and together with the general description of the disclosure given above and the detailed description of the drawings given below, serve to explain the principles of the disclosures.

It should be understood that the drawings are not necessarily to scale. In certain instances, details that are not necessary for an understanding of the disclosure or that render other details difficult to perceive may have been omitted. It should be understood, of course, that the disclosure is not necessarily limited to the particular embodiments illustrated herein.

Figure 1:
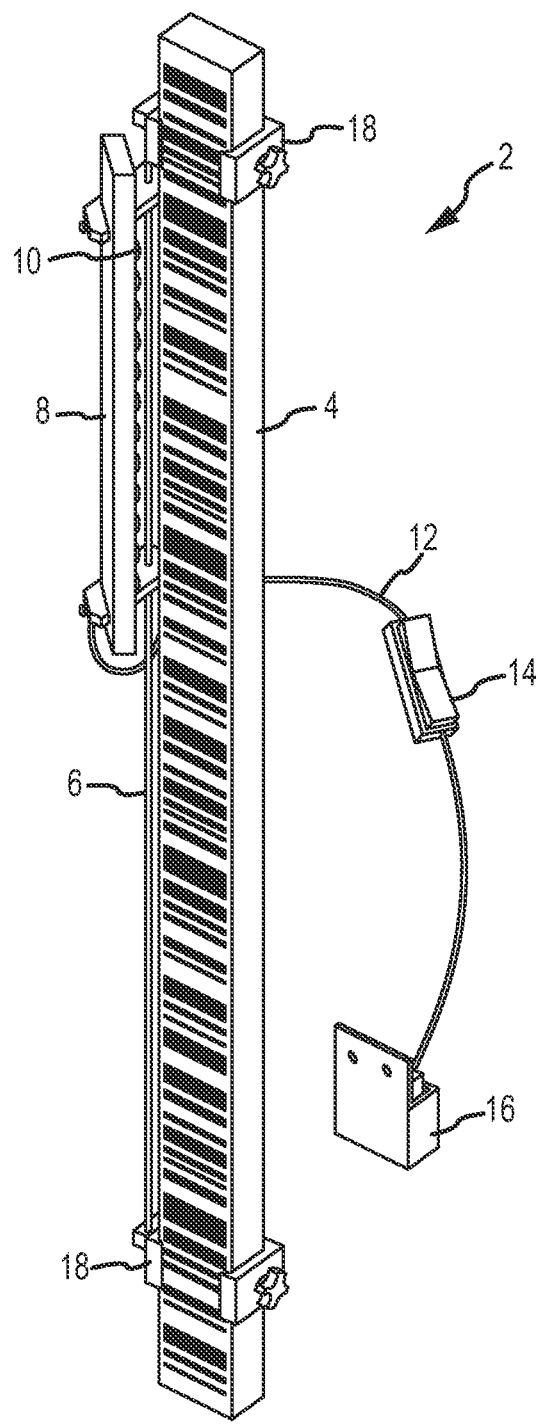
Figure 2:
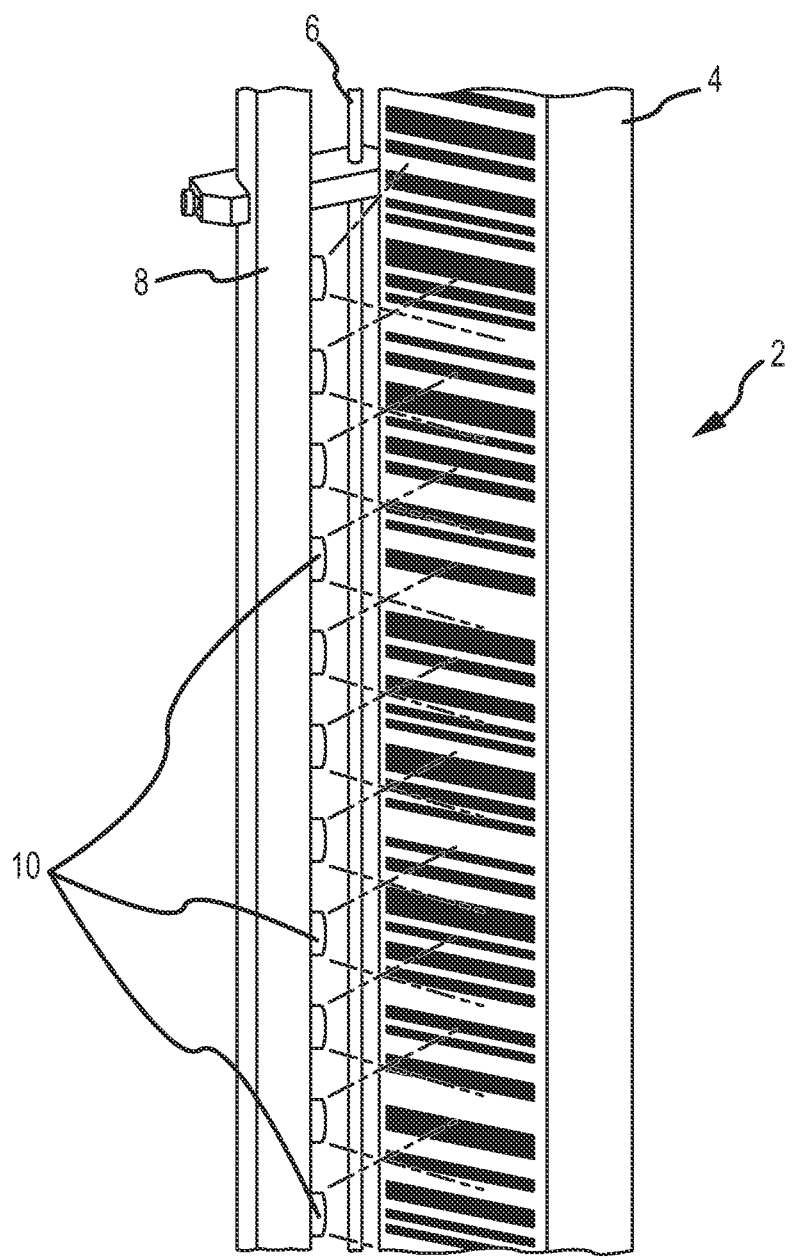
Figure 3:
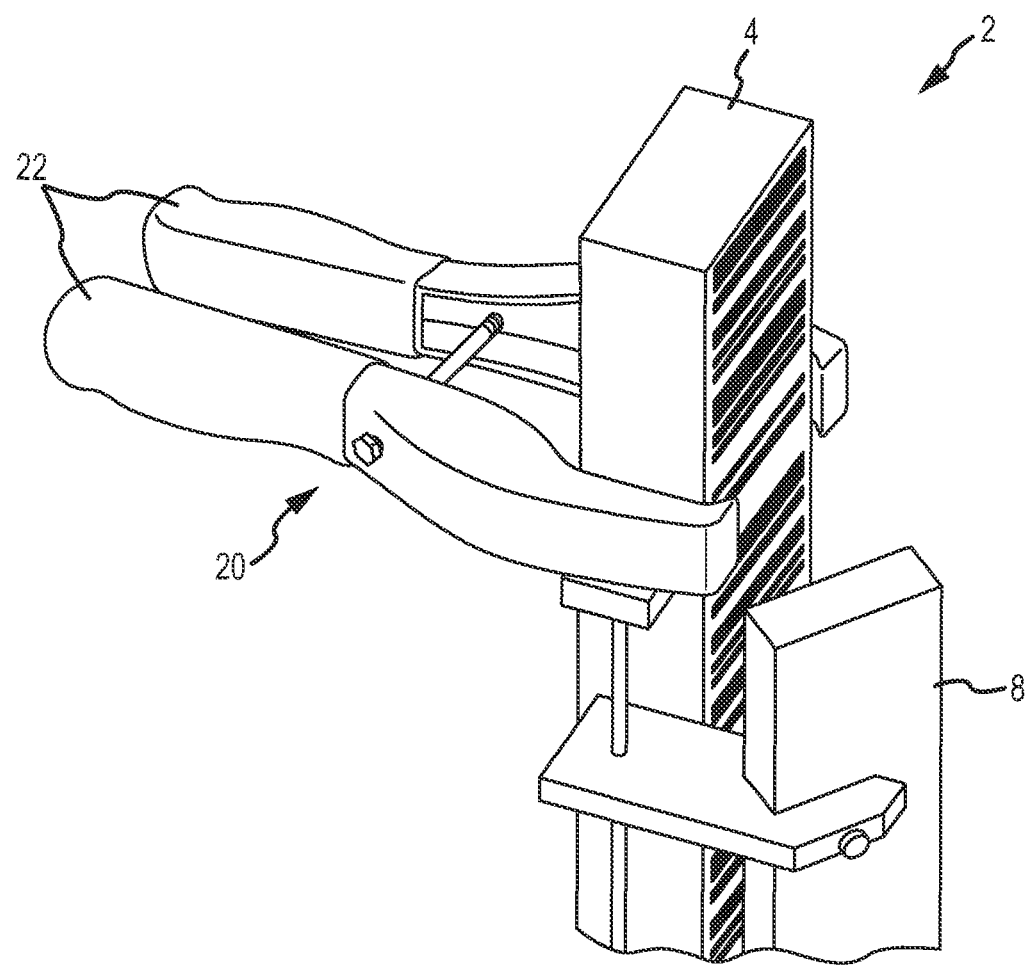

FIG. 1 is a front perspective view of a surveying instrument with an integrated lighting element according to one embodiment;

FIG. 2 is a detailed perspective view of a surveying instrument with an integrated lighting element according to one embodiment;

FIG. 3 is front perspective view of a surveying instrument with an integrated lighting element according to one embodiment.

DETAILED DESCRIPTION

The present invention has significant benefits across a broad spectrum of endeavors. It is the applicant's intent that this specification and the claims appended hereto be accorded a breadth in keeping with the scope and spirit of the invention being disclosed despite what might appear to be limiting language imposed by the requirements of referring to the specific examples disclosed. To acquaint persons skilled in the pertinent arts most closely related to the present invention, a preferred embodiment of the method that illustrates the best mode now contemplated for putting the invention into practice is described herein by, and with reference to, the annexed drawings that form a part of the specification. The exemplary method is described in detail without attempting to describe all of the various forms and modifications in which the invention might be embodied. As such, the embodiments described herein are illustrative, and as will become apparent to those skilled in the arts, can be modified in numerous ways within the scope and spirit of the invention, the invention being measured by the appended claims and not by the details of the specification.

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning Finally, unless a claim element is defined by reciting the word "means" and a function without the recital of any structure, it is not intended that the scope of any claim element be interpreted based on the application of 35 U.S.C. §112, sixth paragraph.

FIG. 1 depicts an illuminated leveling rod system 2 with a leveling rod 4 of the bar-code type having at least one lighting element 8 with LED features/lights 10 and a track 6. Although FIG. 1 depicts the present invention comprising a leveling rod 4 of the bar-code type, it is expressly understood that the present invention is not limited to this embodiment. Indeed, any number of surveying/leveling rods and/or sticks may be employed in various embodiments of the present invention, including conventional graduated rods and other instruments as will be recognized by one of ordinary skill in the art.

As shown in FIG. 1, a track 6 is mounted along at least a portion of a length of a leveling rod 4, wherein a longitudinal axis of the track 6 is generally parallel to a longitudinal axis of the leveling rod 4. A lighting element 8 is slidably coupled to the track/rod combination, such that the lighting element 8 can be selectively positioned along a length of the rod 4. In one embodiment, a track 6 and a lighting element 8 occupy substantially the entire length of a rod. In an alternative embodiment, a lighting element 8 has a length that is only a portion of the length of the rod 4 and the lighting element 8 is slidably coupled on a track 6 having a length substantially the same as the length of the rod 4. It will be expressly recognized that lighting elements 8 and tracks 6 of the present disclosure may be of any number of lengths.

FIG. 1 depicts a lighting element 8 slidably coupled to a track 6 and being in a position wherein the lighting element 8 is generally rotated away from the rod 4. In various surveying operations, it may be advantageous to position a lighting element 8 such that it is disposed at some distance away from the rod 4. For example, where measurements are taken at various locations with respect to the rod, it is desirable that the laser or sight-line is not obstructed by a lighting element 8 and associated features. Thus, in various embodiments, the present invention contemplates a rotatably adjustable lighting element 8 that can be disposed in a number of angular positions and direct light to the rod surface from a variety of different orientations. Rotatable aspects of the present disclosure provide for maximum illumination of the rod or other object while not obstructing a line of sight.

In the embodiment shown in FIG. 1, a lighting element 8 slidably mounted on a track 6 is connected to and powered by a power unit 16, such as a NiMH battery and/or Li-ion battery. The power unit 16 is connected to and in communication with a control switch 14 via a transmission wire 12 for providing power to the lights 10 and/or selectively translating a lighting element along a length of the leveling rod. By way of example, a suitable battery for these purposes is a 12V, 2.3-2.9 amp hour AGM Sealed Non-Spillable Battery with an ElectoSwitch Miniature Switch, J37 two position Rocker Switch with snap-in actuator or compatible. The light bar may be a LED white light 6000+ Kelvin SMD 12 v, 0.65+/−led spacing on a waterproof bar.

In one embodiment, the power unit 16 and control switch 14 comprise user-mounted features. For example, the power unit 16 and control switch 14 may comprise one or more relatively small and lightweight features for mounting or attaching to a user (e.g. via tool belt or belt clip(s)). In an alternative embodiment, one or more of the control switch 14 and power unit 16 may be permanently or selectively mounted on a portion of the leveling rod 4, such as on a peripheral or rear portion of the leveling rod 4 such that the device(s) will not interfere with readings and measurements. In one embodiment, at least the control switch 14 is mounted at a height generally accessible and convenient for a human user (e.g. between approximately 3 feet and 6 feet from a bottom or ground portion of the device).

In one embodiment, a power unit 16 and/or control switch 14 are in communication with one or more servo-motors in association with a lighting element 8 and adapted to translate the lighting element 8 along the track 6, such as through the selectively rotation of gears or wheels in communication with the track 6. In one embodiment, the track 6 comprises a rack upon which a lighting element 8 is translated via a pinion gear. In an alternative embodiment, the track 6 comprises a worm-gear or elongate helical gear, the track 6 being selectively rotatable upon activation of a control switch or control feature in order to translate the lighting element 8 along the track/worm gear. In yet another embodiment, the track 6 is translatable, such as through activation of a rack and pinion device adapted to translate the rack and attached lighting element with respect to a rod. One of ordinary skill in the art will recognize a number of different devices and methods for translating an object along a rod or track. The present invention is not limited to any specific method or device for translating a lighting element and it is expressly contemplated that any known device or system may be employed.

FIG. 2 depicts one embodiment of a leveling rod 4 having at least one lighting element 8, wherein the lighting element has been rotated inwardly or toward the surface of the leveling rod 4. In one embodiment, the lighting element 8 is rotatably positioned along the track 6, such that basic user manipulation may orient the rotational position of the element 8. A frictional force may be achieved by the tolerance and fit between the lighting element 8 and the track 6 such that unwanted rotation is limited. In alternative embodiments, hinges may be provided for connecting a lighting element 8 to a track 6 such that the element 8 is rotatable with respect to the track 6 and rod 4. One of ordinary skill in the art will recognize that given various different environmental and/or lighting conditions, it may be necessary to vary the amount of light imparted upon the surface of the rod 4. Thus, in low light conditions, for example, a lighting element 8 of the present invention may be rotated inwardly or closer to the surface of the rod 4 for greater rod 4 and/or bar-code illumination or alternatively include a device which effectively adjusts the level of illumination required.

In various embodiments, the vertical position of a lighting element 8 is secured or maintained through one or more fasteners. For example, one or more set screws are provided in various embodiments to secure a lighting element 8 is a desired vertical position with respect to the track 6 and rod 4. Alternatively, one or more removable pins or shims are provided to secure the position of a lighting element 8. In embodiments where the lighting element 8 comprises substantially the same length as the track 6, the vertical position of the track may be adjusted by the placement of one or more clamps 18.

FIG. 3 depicts one embodiment of the present invention wherein a track 6 and corresponding lighting element 8 with lighting features 10 are secured to a surveying rod 4 by a clamp 20. As shown, clamp 20 comprises a hand clamp with a torsion spring which is selectively secured to a rod 4 at various locations or positions. In various embodiments, the clamp 20 comprises arms 22 for operating clamp features. These arms 22 further provide a support rest for the system 2, such that the rod may be laid down and set apart from a ground surface wherein the arms 22 serve as weight bearing or support members for the system 2. Arms 22 act in this manner to prevent damage and contamination of the rod 4 and associated elements and lighting feature(s) 8. One or more clamps 20 may be provided to secure one or more lighting elements 8 to a rod and provided in combination with various additional features shown and described herein. For example, a lighting element 8 and a track 6 along which the element is translatable may be secured to a rod by a clamp 20. In such an embodiment, the clamp 20 provides additional vertical adjustability for the lighting element 8, for example. Alternatively, the clamp 20 may provide the sole means for translating a lighting element along the length of a rod 4. One of skill in the art will recognize that various combinations of the features shown and described herein may be provided. Accordingly, the present invention is not limited to any particular arrangement of features.

Although FIGS. 1-3 depict the present invention comprising a lighting element disposed on one side of a leveling rod, it will be understood that a lighting element may be disposed on either side of the rod. In one embodiment, it is contemplated that at least one lighting element is disposed on each side of the rod. It another embodiment, the rod comprises one or more lighting elements on a top and/or bottom portion of the rod.

In one embodiment, the present invention comprises a lighting element system which is selectively attachable or retro-fitable to existing leveling rods. For example, it is known that surveying professionals may have invested resources in surveying rods which are generally functional and valuable under daylight conditions but may require enhancements to be properly used at night or in dark conditions. Accordingly, an embodiment is contemplated whereby a track and/or lighting element is provided that is attachable to a rod, such as through a variety of known clamping or fastening devices. Thus, the present invention is adapted for interconnection to old, conventional rods, or may be adapted for use in the manufacturing of or interconnection to a new rod.

While various embodiments of the present disclosure have been described in detail, it is apparent that modifications and alterations of those embodiments will occur to those skilled in the art. However, it is to be expressly understood that such modifications and alterations are within the scope and spirit of the present disclosure, as set forth in the following claims. For example, while various embodiments contemplate use of lighting features as shown and described herein in connection with surveying rods, the present invention is not so limited. Lighting features of the present invention may be employed with a variety of instrumentation, including prisms, total stations, plumb-bobs, measuring tape, leveling equipment, etc.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the disclosure.

Moreover, though the present disclosure has included description of one or more embodiments and certain variations and modifications, other variations and modifications are within the scope of the disclosure, e.g. the use of a certain component described above alone or in conjunction with other components may comprise a system, while in other aspects the system may be the combination of all of the components described herein, and in different order than that employed for the purpose of communicating the novel aspects of the present disclosure. Other variations and modifications may be within the skill and knowledge of those in the art, after understanding the present disclosure. This method of disclosure is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

Example 1

Ten field tests were performed with 25 measurements per test date with the light bar on active surveying projects. The field tests performed at night between 8 pm and 3 am with a flashlight revealed that laser readings were only successful 55% of the time. In contrast, a LED component as shown and described herein proved 100% success rate. It was also found that the readings could be conducted to the farthest limitations of the leveling equipment as opposed to distance being limited to light source limits. The lighted portion of the rod was constant in size and intensity no matter what the distance was from the level to the rod. It was also much more convenient than carrying cumbersome flashlights, or use of an industrial light plant which needed to be pulled behind a vehicle, which are extremely limited in range both horizontally, and vertically. It was found to be very convenient, and practical to have the device attached to the same rod used on a daily basis, meaning work could continue through the transition from light to dark, or dark to light with little or no interruption.

Example 2

In field tests, the illuminated rod actually increased speed of measurements due to the instrument operator being able to quickly sight or spot the target. The operator was able to identify the rod at a new position and aim the level instrument at the rod faster with the rod illuminated in the dark than in the daylight. This was determined by ten field tests performed with 25 measurements per test date with the light bar on a active surveying project. The field tests were performed at night between 8 pm and 3 am with an illuminated rod and in the daytime between 9 am and 4 pm and revealed that sighting speed was increased with the illuminated light by 22%.

What is claimed is:

1. An illuminated surveying measuring device, comprising:
   an elongate member comprising a longitudinal axis, and a laser readable interface on at least one surface, the laser readable interface adapted for communication with a laser emitting device;
   a lighting element selectively securable to the elongate member in a desired location, wherein the lighting element comprises at least one light emitting diode, and wherein the lighting element is rotatable about the longitudinal axis of the elongate member;
   a power source associated with the lighting element; and
   wherein the power source is in communication with at least one rotatable element to translate the lighting element with respect to the elongate member.

2. The illuminated surveying measuring device of claim 1, wherein the elongate member comprises a foldable member.

3. The illuminated surveying measuring device of claim 1, wherein the elongate member comprises a telescoping track.

4. The illuminated surveying measuring device of claim 1, wherein the elongate member comprises a material selected from the group consisting of plastic, fiberglass, aluminum, wood, and steel.

5. The illuminated surveying measuring device of claim 1, wherein the lighting element is slidably secured for travel between a first end and a second end of the member.

6. The illuminated surveying measuring device of claim 1, wherein the lighting element is rotatable about the longitudinal axis of the elongate member for selectively varying the amount of light imparted upon a surface of the member.

7. An illuminated surveying measuring device, comprising:
   an elongate surveying rod comprising a first length extending in a longitudinal axis, and a laser readable interface on at least one surface, the laser readable interface adapted for communication with a laser emitting device;
   a lighting element interconnected to the elongate surveying rod, wherein the lighting element comprises at least one light emitting diode for illuminating said laser readable interface;
   wherein the lighting element comprises a length that is less than the first length of the elongate surveying rod, and wherein the lighting element is selectively movable with respect to the elongate surveying rod along at least the longitudinal axis; and
   a power source associated with the lighting element.

8. The illuminated surveying measuring device of claim 7, wherein the elongate surveying rod comprises a foldable rod.

9. The illuminated surveying measuring device of claim 7, wherein the elongate surveying rod comprises a telescoping member.

10. The illuminated surveying measuring device of claim 7, wherein the lighting element is rotatable about the longitudinal axis of the elongate surveying rod.

11. The illuminated surveying measuring device of claim 7, wherein the elongate surveying rod comprises a material selected from the group consisting of plastic, fiberglass, aluminum, wood, and steel.

\* \* \* \* \*